United States Patent Office 3,637,839
Patented Jan. 25, 1972

3,637,839
PROCESS FOR THE PREPARATION OF ε-AMINO-
CAPROIC ACID, ε-AMINOCAPROAMIDE, OR
MIXTURES THEREOF
Ikuzo Tanaka, Hideo Uehara, and Masayuki Yamagata,
Tokyo, Japan, assignors to Teijin Limited, Osaka,
Japan
No Drawing. Filed June 23, 1969, Ser. No. 835,796
Claims priority, application Japan, June 25, 1968,
43/44,106; June 29, 1968, 43/45,463; Oct. 7,
1968, 43/73,016; Oct. 16, 1968, 43/75,422
Int. Cl. C07c 99/00, 103/02
U.S. Cl. 260—534 R                                    13 Claims

ABSTRACT OF THE DISCLOSURE

Process for the preparation of ε-aminocaproic acid, ε-aminocaproamide, or mixtures thereof in high yield which can be converted into ε-caprolactam, by contacting 2-nitrocyclohexanone, 2 - nitrocyclohexen - 1 - ol or mixtures thereof with hydrogen in an aqueous medium of pH 4.5–13 at a temperature ranging from 5 to 220° C. in the presence of an active hydrogenation catalyst, preferably in the presence of an ammonium ion, such as ammonia and ammonium salts of organic or inorganic acids.

This invention relates to the preparation of ε-aminocaproic acid, ε-aminocaproamide or mixtures thereof.

The object of the invention is to provide a novel, industrial and economical process for the preparation of ε-aminocaproic acid, ε-aminocaproamide or mixtures thereof which are intermediates for the production of ε-caprolactam. As is well known, ε-caprolactam is an important starting material for producing nylon-6 which is widely utilized as synthetic fibers and resins.

ε-Aminocaproic acid and ε-aminocaproamide are equivalent compounds and can be converted into ε-caprolactam by heating in an aqueous medium at an elevated pressure and at temperature of for example, 200–300° C. as well as other methods.

Thus, an economical and highly efficient process for the preparation of ε-aminocaproic acid and/or ε-aminocaproamide will be industrially very valuable.

Prior art methods for the preparation of ε-aminocaproic acid or ε-aminocaproamide include the following:

(a) Preparation of ε-aminocaproic acid; 2-nitrocyclohexanone is ring-opened by a treatment with an aqueous solution of sodium bicarbonate, followed by the addition of dilute hydrochloric acid to the system to precipitate the ε-nitrocaproic acid which is then isolated by extraction with ether. The ε-nitrocaproic acid is then catalytically reduced in an azotropic ethanol-water system, using a platinum oxide catalyst, to form ε-aminocaproic acid [Journal of Organic Chemistry, vol. 32, 1995 (1967)].
(b) Preparation of ε-aminocaproamide: ethyl ε-aminocaproate is reacted with ammonia [J. Am. Chem. Soc., vol. 68, 1684 (1946)], or
(c) δ-Cyanovaleramide is catalytically reduced [Clau Berther, Ber., vol. 92, 2616 (1959)].

However, method (a) for preparing ε-aminocaproic acid is unduly complex for industrial use and is not economically practical, because the reaction is performed in two stages, because sodium bicarbonate is used as a reactant, and furthermore because precipitation with acid, extraction, and other processes are required for the isolation of the ε-aminocaproic acid.

Neither methods (b) or (c) are economically satisfactory, because the starting materials for these methods are not available at low cost.

Accordingly, an object of the invention is to provide a low cost, single step process for the preparation of ε-aminocaproic acid, ε-aminocaproamide, or mixtures thereof from readily available 2-nitrocyclohexanone (keto form), 2-nitrocyclohexen-1-ol (enol form isomer thereof), or mixtures thereof.

Other objects and advantages of the present invention will become apparent from the following descriptions.

According to the process of the present invention, ε-aminocaproic acid, ε-aminocaproamide or mixtures thereof can be very easily obtained at high yields, by contacting 2-nitrocyclohexanone and/or 2-nitrocyclohexen-1-ol with hydrogen in an aqueous medium of pH 4.5–13, at temperatures ranging from 5° to 220° C., in the presence of an active hydrogenation catalyst. When the temperature employed is 5° C. or higher but lower than 75° C. ($5 \leq t < 75$), the reaction is effected in the additional presence of ammonium ion ($NH_4^+$) in an amount sufficient to provide an ammonium ion rate ($x$) of at least the value ($k$) calculated from the equation, $$(x) \geq k = \frac{75 - t^1}{70}$$

in which $t_1$ stands for the reaction temperature (° C.), said ammonium ion ratio ($x$) being the quotient obtained by dividing the mole number of total $NH_4^+$ ion in the aqueous medium with the total mole number of 2-nitrocyclohexanone and/or 2-nitrocyclohexen-1-ol in the aqueous medium.

2-nitrocyclohexanone which is used as the starting material of the subject process can be easily prepared, for example, by reacting the acetyl nitric acid, obtained from a reaction of acetic anhydride with conc. nitric acid, with 1-acetoxycyclohexen [The Journal of Organic Chemistry, vol. 31, 375 (1966)], or by treating cyclohexene with an acetic anhydride-conc. nitric acid system followed by oxidizing with an oxidizing agent such as chromic anhydride [The Journal of American Chemical Society, vol. 82, p. 3588 (1960); The Journal of Organic Chemistry, vol. 27, 2322 (1962); ibid., 27, 3049 (1962); ibid., 28, 1765 (1963)].

The foregoing methods yield the reaction products which are normally mixtures of the keto form, 2-nitrocyclohexanone, and the enol form 2-nitrocyclohexen-1-ol, the keto form content generally being higher.

While studying refining procedures for the 2-nitrocyclohexanone mixtures it has been discovered that while the keto form is stable during recrystallization, it is substantially converted to the enol form during heating or distillation, as illustrated by the formula below. Further, if the enol form isomer is allowed to stand at low temperatures, it is converted back to the keto form.

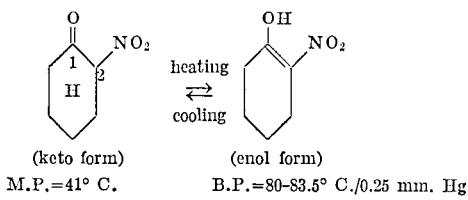

(keto form)  
M.P.=41° C.

(enol form)  
B.P.=80-83.5° C./0.25 mm. Hg

The relations of the atomic groups and the wave numbers at which their characteristic absorptions are observed in infrared absorption spectra of the two isomers are as follows:

Atomic group: Wave number whereat characteristic absorption is observed, cm.$^{-1}$
- $>C=O$ (keto form) _____ 1733
- $-NO_2$ (keto form) _____ 1555
- $>C=<$ (enol form) _____ 1610
- (1) _____ 1510

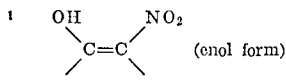 (enol form)

Therefore, the reversible conversions between keto and enol forms can be confirmed by measurements of the infrared absorption spectrum, at the wave numbers exhibiting the characteristic absorption.

The quantitative relationship between the two isomers can also be more precisely determined by measuring nuclear magnetic resonance spectrum and calculating the area ratio of the hydrogen atoms on the carbon atom to which the nitro group is bonded (4.5–5.0τ), to the hydrogen atoms of enol form hydroxy group (−3.97τ).

After repetitive analyses with the above-described various methods, we discovered that all of a keto form: 2-nitrocyclohexanone, the enol form isomer thereof: 2-nitrocyclohexen-1-ol, and the mixtures thereof, are equally useful as the starting materials of the subject invention. Namely, all of them can be converted to ε-aminocaproic acid, ε-aminocaproamide or mixtures thereof in accordance with the subject process.

Further, there are no disclosures in the prior art showing a direct hydrogenation of either 2-nitrocyclohexanone (keto form), 2-nitrocyclohexen-1-ol (enol form) or mixtures thereof.

It has been discovered that the catalytic hydrogenation of 2-nitrocyclohexanone, 2-nitrocyclohexen-1-ol, and mixtures thereof when performed in accordance with the conditions of the present process, a cleavage of carbon bond between the carbons 1 and 2 occurs, and the $NO_2$ group on the carbon 2 is smoothly catalytically reduced to produce ε-aminocaproic acid, although the reaction mechanisms are not entirely clear. Furthermore, it has been discovered that, when ammonium ion is present exceeding a certain level in the reaction system, the above reaction forming ε-aminocaproic acid is accelerated. It has also been found that when this ammonium ion is supplied from ammonia or an aqueous ammonia, a reaction to form ε-aminocaproamide occurs simultaneously with the reaction to form ε-aminocaproic acid, under certain conditions.

Hereinafter the subject invention will be described in further detail.

According to the invention, 2-nitrocyclohexanone (keto form), 2-nitrocyclohexen-1-ol (enol form) or mixtures thereof are contacted with hydrogen in an aqueous medium of pH 4.5–13, at temperatures ranging from 5°–220° C., in the presence of an active hydrogenation catalyst. If the temperature employed is 5° C. or higher but lower than 75° C., additional ammonium ion in the aqueous medium is necessary, in an amount such that the ammonium ion ratio $(x)$ in the medium should be at least the value $(k)$ calculated by the Equation 1 below:

$$k = \frac{75 - t_1}{70} \quad (1)$$

in which $t_1$ is a temperature not lower than 5° C. but below 75° C.

Under such specific conditions, ε-aminocaproic acid, ε-aminocaproamide or mixtures thereof are formed in the aqueous medium. The ammonium ion ratio $(x)$ is the value calculated by dividing the mole number of total ammonium ion in the aqueous medium with the total mole number of 2-nitrocyclohexanone, 2-nitrocyclohexen-1-ol or mixtures thereof in that medium.

When the catalytic hydrogenation of the invention is conducted at the temperatures not lower than 5° C. but below 75° C., the presence of ammonium ion in the aqueous medium is necessary, the amount thereof being such as will provide an ammonium ion ratio $(x)$ which is not less than the value $(k)$ calculated from the foregoing Formula 1. On the other hand, when the reaction is conducted at 75°–220° C., presence of ammonium ion in the aqueous medium is not necessarily required. The presence of suitable amount of ammonium ion in the aqueous medium is however preferred even when such higher temperatures are employed, because it assists the smooth progress of the reaction and further improves the yields of ε-aminocaproic acid, ε-aminocaproamide or mixtures thereof by inhibiting the formation of side products.

There is no critical upper limit as to the amount of ammonium ion which may be present in the aqueous medium. However, in certain cases, excessive presence of ammonium ion tends to lower the catalytic reducing ability of the catalyst employed. Thus the upper limit on the amount of ammonium ion in the aqueous medium must be determined for each individual reaction considering the combined factors such as concentration of starting material, i.e. 2-nitrocyclohexanone and/or 2-nitrocyclohexen-1-ol, in the aqueous medium, reaction temperature, type of the hydrogenation catalyst, type of the ammonium ion supplying source etc. Normally the reaction of the present invention progresses without any appreciable trouble, when the ammonium ion ratio $(x)$ is approximately 15 or less.

According to the invention, the pH of the aqueous medium must be maintained at 4.5–13, preferably 5.5–12, regardless of the presence or absence of ammonium ion therein. When the pH is below 4.5, the formation of objectionable by-products such as adipic acid increases, and some hydrogenation catalysts have lowered catalytic activity. When it exceeds 13, the catalytic activity is also impaired. Therefore, in either case, the reaction rate is decreased similarly.

The ammonium ion can be supplied from various sources such as ammonia, aqueous ammonia, suitable ammonium salts of inorganic weak acids such as ammonium bicarbonate, carbonate, borate, phosphate, etc., and also ammonium salts of organic carboxylic acids such as ammonium formate, acetate, etc. Among the foregoing, ammonium salts of volatile acids such as ammonium carbonate, bicarbonate, formate, and oxalate, etc. are preferred, while ammonia and aqueous ammonia are also particularly advantageous. Aci-ammonium salts of organic nitro compounds, for example, can also be used as the source of ammonium ion, particularly aci-2-nitrocyclohexanone ammonium being preferred. The pH adjustment of the aqueous medium can be effected either by one or more of the foregoing ammonium ion sources, such as ammonia, aqueous ammonia, or the named ammonium salts, or by concurrent use of other basic substances, acidic substances, or salts thereof.

When the aforesaid aci-2-nitrocyclohexanone ammonium is added to the aqueous medium employed of the present invention, it dissociates into aci-2-nitrocyclohexanone anion and ammonium cation. The aci-2-nitrocyclohexanone anion participates in the process of this invention as a starting material in an identical manner as 2-nitrocyclohexanone. The ammonium cation also affects the reaction medium in the same manner as when ammonia or aqueous ammonia is added to the aqueous medium.

Accordingly, aci-2-nitrocyclohexanone ammonium can be used as an ammonium ion source concurrently with 2-nitrocyclohexanone, 2-nitrocyclohexen-1-ol, or mixtures thereof or by itself as the starting material. In the latter case, the reaction proceeds in substantially the same manner as the addition of both equimolar 2-nitrocyclohexanone and ammonia to the aqueous medium. When aci-2-nitrocyclohexanone ammonium is used as the starting material, an additional ammonium ion source such as ammonia, aqueous ammonia, or other ammonium bicarbonate, etc., may be added in order to adjust the ammonium ion ratio in the aqueous medium to a desired value.

When aci-2-nitrocyclohexanone ammonium is used, the aci-2-nitrocyclohexanone anion formed therefrom in the aqueous medium is treated as an equivalent of 2-nitrocyclohexanone as a starting material, and is to be included in the total mole number of 2-nitrocyclohexanone, 2-nitrocyclohexen-1-ol or mixtures thereof in the calculation of ammonium ion ratio.

Aci-2-nitrocyclohexanone ammonium is a novel compound represented by the formula,

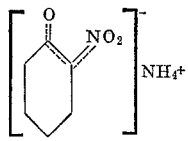

This novel compound can be prepared by reacting 2-nitrocyclohexanone, 2 - nitrocyclohexan-1-ol or mixtures thereof with ammonia, in the absence of any solvent, or in the presence of a substantially anhydrous inert organic solvent in which the reaction product, i.e., aci-2-nitrocyclohexanone ammonium, is substantially insoluble at temperatures ranging from the freezing point of the solvent to 50° C., and preferably from 5° C. to 40° C. The following inert organic solvents may be used: ethers or cyclic ethers such as ethylether, tetrahydrofuran, dioxane, etc.; cycloaliphatic hydrocarbons such as cyclohexane, Decalin, etc.; aliphatic hydrocarbons such as n-pentane, n-hexane, n-heptane, etc.; petroleum hydrocarbons such as petroleum ether, ligroin etc.; aromatic hydrocarbons such as benzene, toluene, xylene, etc.; chlorinated hydrocarbons such as methylene chloride, chloroform, carbon tetrachloride, ethylene dichloride, etc.; ketones such as acetone, methyl ethyl ketone, cyclohexanone, etc.; fatty acid esters such as methyl formate, ethyl acetate, etc.; alcohols such as methyl alcohol, ethyl alcohol, isopropyl alcohol, etc.; and acetonitrile, etc. The amount of such a solvent is not critical, but the usual amount used is 2 to 20 times by weight of 2-nitrocyclohexanone and/or enol form isomer thereof. It is preferred to select such an amount of solvent as will allow easy separation of aci-2-nitrocyclohexanone ammonium precipitate formed.

In the aci-2-nitrocyclohexanone ammonium-forming reaction, ammonia is preferably used in the form of gas, and at least one mole of ammonia is used per one mole of the other reactants, i.e., 2-nitrocyclohexanone, 2-nitrocyclohexen-1-ol or mixtures thereof. When a protic compound is present in the reaction system either as the organic solvent or as impurities contained therein (for example, water, alcohol, etc.), the ammonia should be used so that its amount does not exceed an equimolar amount with respect to the nitrocyclohexanone, 2-nitrocyclohexen-1-ol or mixtures thereof in the reaction system.

At any reaction temperature within the range of 5 to 220° C., the reaction of the present invention can be controlled to form the following products when ammonia and/or an aqueous ammonia is used as a source of an ammonium ion:

(a) ε-Aminocaproic acid is the main product when the amount of ammonium ion supplied from the ammonia and/or aqueous ammonia to the aqueous medium is such that the ammonium ion ratio $(x)$ will be 1 or less;

(b) A mixture of ε-aminocaproic acid and ε-aminocaproamide is the product when the amount of the ammonium ion present in the aqueous medium in such that the ammonium ion ratio $(x)$ will be more than 1 but less than 3 and (c) ε-Aminocaproamide is the main product when the amount of the ammonium ion present in the aqueous medium is such that the ammonium ion ratio $(x)$ will be at least 3.

When aci-2-nitrocyclohexanone ammonium is used as the starting material, ε-aminocaproamide can be mainly formed by adding ammonia, of an amount at least equimolar thereto, to the aqueous medium in the form of ammonia or an aqueous ammonia. When ammonium ion supply sources other than the ammonia, aqueous ammonia and aci-2-nitrocyclohexanone ammonium are used without any particular pH adjustment, the reaction of the present invention generally proceeds to form ε-aminocaproic acid, irrespective of the above-mentioned ammonium ion ratio $(x)$.

Although the reaction of the present invention can be controlled either to forming ε-aminocaproic acid as the main product or to form ε-aminocapramide as the main product, depending upon the type of the ammonium ion supply source, the ammonium ion ratio, etc., the product is further affected by such factors as the concentration of the starting material in the aqueous medium, reaction temperature, reaction time, and pH. Nevertheless, both the ε-aminocaproic acid and ε-aminocapramide formed in accordance with the process of the invention are significantly important as an intermediate for preparing ε-caprolactam. Since ε-aminocaproic acid and ε-aminocapramide can be reacted under quite similar conditions to form ε-caprolactam, the advantages of the present invention are not lost, irrespective of the ratio of ε-aminocaproic acid to ε-aminocapramide formed in the reaction.

When the reaction of this invention is performed at the temperatures not lower than 5° C. but below 150° C., the ε-aminocaproic acid, ε-aminocaproamide or mixtures thereof formed are stable in the reaction mixture and can be isolated from the reaction mixture substantially unchanged even after remaining in the mixture a considerable period of time.

However, when the reaction temperature ranges from 150–220° C., ε-aminocaproic acid, ε-aminocaproamide or mixtures thereof tend to partially be converted into ε-caprolactam and oligomers thereof. Therefore, in order to produce the ε-aminocaproic acid, ε-aminocaproamide or mixtures thereof in high yield, it is preferred to control the reaction time (H) within the following range under such high temperatures:

$$H \leq 280 - t_2$$

preferably, $$H \leq 275 - t_2$$

in which H denotes heating time (in minutes), and $t_2$ denotes a temperature (° C.) within the range of 150–220° C.

whereby the ε-aminocaproic acid, ε-aminocaproamide or mixtures thereof can be obtained normally at the yield of not less than approximately 70 mol percent, particularly not less than 80 mol percent.

Although any temperature within the range of 5–220° C. may be employed in the reaction, the range of 20–220° C. is preferred. The reaction is continued until the hydrogen consumption in the reaction system substantially terminates.

As already stated, the reaction of the present invention is performed in the presence of an active hydrogenation catalyst, in an aqueous medium of pH 4.5–13.

The water to be employed as the main component of this aqueous medium may be any water normally used industrially for chemical reactions. The aqueous medium can contain not more than approximately 50 wt. percent, preferably not more than approximately 30 wt. percent, of such compounds as (a) lower aliphatic alcohols such as methanol, ethanol, etc.,
(b) ethers of 4–8 carbons such as dioxane, tetrahydrofuran, diisopropyl ether, etc., and
(c) aromatic hydrocarbons of 6–10 carbons, such as benzene, toluene, xylene, etc.

The active hydrogenation catalyst to be employed in the process of the present invention can be any known hydrogenation catalyst which is active under the specified reaction conditions. The catalyst is normally selected from known hydrogenation catalysts for the reduction of the nitro group to the amino group.

Useful catalysts include, for example, metals from Group VIII of the periodic table consisting of cobalt (Co), nickel (Ni), ruthenium (Ru), rhodium (Rh), palladium (Pd), platinum (Pt), iridium (Ir), and osmium (Os), and the compounds of those metals which can form these metals under the reaction conditions employed in the process of the present invention. (This provision is hereinafter referred to as "which can form the metals in the reaction system.") Among the foregoing, at least one catalyst selected from the group consisting of nickel, palladium, platinum and cobalt, and oxides thereof, is particularly preferred. For example, nickel-containing catalysts such as reduced nickel, Raney nickel, stabilized nickel, nickel-potassium, Urushibara nickel, nickel boride, nickel formate, nickel sulfate, etc.; palladium-containing catalysts such as palladium black, palladium sponge, palladium oxide, palladium-carbon, etc.; platinum-containing catalysts such as platinum black, platinum sponge, platinum oxide, platinum-carbon, etc., and cobalt-containing catalysts such as reduced cobalt, Raney cobalt, Urushibara cobalt, cobalt formate, etc., are suitable. Preferred catalysts of those Group VIII metals and compounds thereof other than above-named include, for example, colloidal rhodium, rhodium-carbon, rhodium oxide, rhodium-platinum, ruthenium dioxide, ruthenium-carbon, colloidal iridium, metal iridium, iridium black, iridium oxide, etc. Raney copper, copper chromite catalysts, etc. can also be used.

Of the above named catalysts, Raney nickel, Urushibara nickel, nickel boride, palladium black, palladium oxide, colloidal palladium, palladium-carbon, palladium hydroxide, palladium sponge catalyst, platinum black, platinum oxide, colloidal platinum, platinum-carbon, platinum sponge catalyst, colloidal rhodium, rhodium-carbon, rhodium oxide, rhodium-platinum, ruthenium dioxide, ruthenium-carbon, colloidal iridium, iridium black, iridium oxide, etc. generally exhibit activity at relatively low reaction temperatures, i.e., within 5°–220° C., employed in the process of the present invention. Therefore, these catalysts can be used at practically any temperature within range suitable for use in the process of the present invention. Other catalysts mentioned above are active at the upper end of the range of temperatures specified, and can therefore be used only under suitably selected temperature conditions. Thus, the use of the other catalysts is also possible after preliminary, experimental use under the reaction conditions within the scope of this invention.

Although the amount of a catalyst to be employed in the invention is not critical, normally no more than 50 wt. percent based on the starting material is sufficient. Greater amounts can be used, however, if required to increase the reaction rate. A generally preferred range is 0.1–20 wt. percent, particularly 0.2–10 wt. percent, based on the starting material.

The aforementioned catalysts can be used by themselves in various forms such as powder, pellet, block, etc., or may be bound to inert porous carrier substances such as carbon, alumina, and silica.

The amount of hydrogen to be employed in the invention is at least 3 mols per mol of the starting material, i.e. 2-nitrocyclohexanone, 2-nitrocyclohexen-1-ol or mixtures thereof. Normally, a preferred range is 4–8 mols of hydrogen per mole of the starting material, but use of greater amounts is in no way detrimental. The partial pressure of hydrogen in the reaction system is not critical, but normally at least 1 atmosphere is preferred. Although a generally higher reaction rate can be obtained under higher partial hydrogen pressure, excessively high pressure is disadvantageous in view of equipment requirements and handling difficulties. Normally employed partial pressure of hydrogen ranges 1–50 atmospheres, preferably on the order of 1–20 atmospheres. The total pressure in the reaction system is provided by the sum of hydrogen pressure and vapor pressures of the aqueous medium and starting material, which should preferably be approximately 4–200 atmospheres (as absolute pressure).

The aqueous medium can be used at such ratios as 2–100 times by weight that of the starting material, i.e., 2-nitrocyclohexanone, 2-nitrocyclohexen-1-ol, or mixtures thereof and preferably 5–30 times by weight.

The reaction of the present invention will be explained in further detail below. 2-nitrocyclohexanone, 2-nitrocyclohexen-1-ol or mixtures thereof, an aqueous medium, and a hydrogenation catalyst are charged in a reactor. When an ammonium ion source is required, it is dissolved or dispersed in the aqueous medium. Then hydrogen is introduced into the system at elevated pressure. Then the system is agitated, heated or cooled as required, and reacted continuously at temperatures ranging 5–220° C., preferably 20–200° C., until hydrogen absorption substantially terminates. Obviously the reaction time should be controlled within the specified range, when the reaction temperature ranges 150–220° C.

The reaction can be performed either as a batch or continuous process.

After the reaction, the reaction mixture is either allowed to cool off as it is and hydrogen, ammonia, and other volatile matters in the reaction system are removed after cooling; or the mixture can discharge into a low pressure zone and cooled while removing hydrogen, ammonia, other volatile matters, and a part of the aqueous medium. Then, the catalyst is removed from the reaction mixture by a conventional means such as filtration or centrifugation. The remaining reaction liquid is distilled, extracted, or recrystallized, to isolate ε-aminocaproic acid, ε-aminocaproamide or mixtures thereof.

The reaction mixture resulting from the subject process can be supplied to the subsequent ε-caprolactam-forming reaction either as is or after suitable concentration without intervening isolation of ε-aminocaproic acid or ε-aminocaproamide from the reaction mixture as described above.

According to the process of the present invention, ε-aminocaproic acid, ε-aminocaproamide or mixtures thereof can be prepared from 2-nitrocyclohexanone, 2-nitrocyclohexen-1-ol, or mixtures thereof by a single stage reaction with easy operation and a very high yield.

The process of the present invention will be further explained with reference to the following working examples, which are for the purpose of illustration only, and are in no way intended to limit the scope of the present invention.

In the following examples, the catalysts employed were those prepared by the methods described in the following literature references:

Raney nickel:
  W-7 method
    H. Adkins & H. R. Billica, J. Am. Chem. Soc. 70, 695 (1948)
  T-4 method
    S. Nishimura & Y. Urushibara, Bull Chem. Soc. Japan, 30 199 (1957)

Nickel boride:
  P. Paul, P. Buisson, N. Joseph, Ind. Eng. Chem., 44 1006 (1952)

Urushibara nickel U-Ni-B:
  Y. Urushibara & S. Nichimura, Bull. Chem. Soc. Japan 27, 480 (1954)

Reduced nickel:
  W. B. Bradt, J. Phys. Chem., 34 2711 (1930)

Nickel formate:
  D. P. Dobychin, et al., J. Phys. Chem. (U.S.S.R.) 13, 1367 (1939)

Urushibara cobalt U-Co-B:
  S. Saito, Journal Pharm, Soc. Japan, 76 351 (1956)

Raney cobalt:
  A. J. Chadwell, H. A. Smith, Jr. J. Phys. Chem., 60 1339 (1956)

Colloidal palladium:
  A. Skita, W. A. Meyer, Ber. 45 3579 (1912)

Colloidal platinum:
  A Skita, W. A. Meyer, Ber, 45, 3579, 3587 (1912)

Rhodium-platinum:
  S. Nishimura, H. Taguchi, Bull. Chem. Soc. Japan 36 873 (1963)

Colloidal iridium:
  W. P. Dunworth, F. F. Nord, J. Am. Chem. Soc., 72 4197 (1950)

Osmium black:
  H. C. Brown, C. A. Brown, J. Am. Chem. Soc. 84 1949 (1962)

Raney iron:
  L. K. H. Freidlin, K. G. Rudneva, A. S. Saltanav, I. Akad. Nauk, U.S.S.R., Otdl. Khim. Nauk, 511 (1954)

Raney copper:
  J. A. Stanfield, P. E. Robbins, Acedes, Conger. Intern. Catalyse, 2e, Paris, 1960, 2, 2579.

The following commercial catalysts were also used: Stabilized nickel, palladium-carbon, palladium black, palladium oxide, platinum-carbon, platinum black, platinum oxide, rhodium-carbon, ruthenium-carbon, Adkins' copper-chromite catalyst.

EXAMPLE 1

In a 300-ml. electromagnetic agitation-type autoclave of SUS 32 stainless steel were placed 7.2 g. (0.05 mol) of a mixture of 2-nitrocyclohexanone and 2-nitrocyclohexen-1-ol (keto form. 80%, enol form; 20%) 13.1 g. of 28% aqueous ammonia ($NH_3$ 100 mol percent/2-nitrocyclohexanone), 40.8 g. of deionized water of pH 5.8 and 1.4 g. of a palladium-carbon catalyst (Pd content=5 wt. percent), and hydrogen was introduced to an initial pressure of 50 kg./cm.$^2$. The system was stirred at 10° C. It was confirmed from an observation of the pressure gauge mounted on the autoclave that hydrogen absorption took place immediately. Approximately 15 minutes thereafter the hydrogen absorption could no longer be observed, but the agitation was continued for additional 30 minutes. Upon completion of the reaction, the catalyst was filtered off from the reaction mixture and water was distilled off under a reduced pressure. Thus 6.3 g. of a white solid was obtained, which showed an infrared absorption spectrum identical with that of ε-aminocaproic acid. However, when the crystalline product was dissolved in water and analyzed by means of thin-layer chromatography, by-product formations of a minor amount of ε-aminocaproamide, as well as a trace of a compound which structure could not be determined, were observed. When all of those by-products were regarded as ε-aminocaproic acid (i.e. presuming ε-aminocaproic acid=6.3 g.), the yield was 96%.

EXAMPLE 2

In a 1-liter shaker-type autoclave of SUS 28 stainless steel were placed 72.0 g. of 2-nitrocyclohexanone (keto form: 100%), 1.54 g. of 28% aqueous ammonia ($NH_3$ 3 mol percent/2-nitrocyclohexanone), 300.0 g. of deionized water of pH 5.8, and 3.5 g. of developed Raney nickel catalyst (W-7), and hydrogen was introduced thereinto to an initial pressure of 92 kg./cm.$^2$. The system was shaken under heating. The temperature was gradually raised to 70° C. during the initial 50 minutes, and then maintained at said level for additional 2 hours. The resulting reatcion mixture was removed of the catalyst by filtration, and treated with a minor amount of active carbon. Upon distilling off the water, 63 g. of white solid was obtained, which gave an infrared absorption spectrum identical with that of ε-aminocaproic acid. The crude yield was 96%.

EXAMPLE 3

In a normal pressure hydrogenation reactor provided with a jacket were placed with 7.2 g. of 2-nitrocyclohexanone, 1.54 g. of 28% aqueous ammonia ($NH_3$:50 mol percent/2-nitrocyclohexanone), and 57 g. of deionized water of pH 5.8. Water heated at 70° C. was circulated through the jacket. Also 1.4 g. of a platinum-carbon catalyst (Pt content=5 wt. percent) as suspended in 5 ml. of water was put in a dropping funnel attached on the upper part of the reactor. The atmosphere in the reactor was substituted with hydrogen, and thereafter the reactor was shaken for an hour. After confirming that no further hydrogen absorption by the solvent and catalyst took place, the catalyst suspension was added to the system through the dropping funnel. Then hydrogenation reaction terminated within approximately an hour. Thereafter the shaking was continued for 7 hours.

The reaction mixture was treated similarly as in Example 2, and 6.4 g. of ε-aminocaproic acid was obtained. The yield was 98%.

EXAMPLE 4

In a normal pressure, hydrogenation reactor provided with a jacket were placed 7.2 g. of 2-nitrocyclohexanone and 62.8 g. of deionized water of pH 5.8, and water of 98° C. was circulated through the jacket. Also 1.4 g. of a platinum-carbon catalyst as suspended in 5 ml. of water was put in a dropping funnel attached to the upper part of the reactor. The atmosphere inside the reactor was substituted with hydrogen. The system was shaken for an hour, and after confirming that no further hydrogen absorption by the solvent and the catalyst took place, the suspended catalyst in the dropping funnel was added to the system. Then hydrogenation reaction ceased after approximately 2 hours. Thereafter the shaking was continued for additional 6 hours, to complete the reaction. Thus the reaction mixture obtained was treated similarly as in Example 2, and 6.3 g. of ε-aminocaproic acid was obtained. The yield was 96%.

EXAMPLES 5-22

The reaction of Example 1 was repeated under the reaction conditions varied for each run. The conditions and the results are given in Table 1 below.

TABLE 1

| Example number | 2-nitro cyclo-hexanone (g.) | Aqueous ammonia (g., mol percent/ 2-nitrocyclohexanone) | Catalyst (g.) | Water (g.) | Reaction temp. and time (° C., min.) | Initial $H_2$ pressure (kg./cm.$^2$) | $\epsilon$-Amino-caproic acid yield, g, (mol percent) |
|---|---|---|---|---|---|---|---|
| 5 | 7.2 | 28% aqueous ammonia (3.1, 100) | Urushibara nickel (U-Ni-B) (1.4) | 64.0 | 90-100(60) | 40 | 6.5(98) |
| 6 | 7.2 | 28% aqueous ammonia (1.54, 50) | Palladium-carbon (0.3) | 39.7 | 70(60) | 50 | 6.4(98) |
| 7 | 7.2 | 10% aqueous ammonia (0.9, 1) | Urushibara cobalt (U-Co-B) (3.5) | 28.8 | 110(120) | 40 | 6.3(96) |
| 8 | 7.2 | 30% aqueous ammonia (2.83, 100) | Platinum-carbon (1.4) | 62.8 | 29-39(45) | 50 | 5.7(87) |
| 9 | 7.4 | 30% aqueous ammonia (2.9, 96) | Stabilized nickel catalyst (nickel-diatomaceous earth 0.8). | 62.8 | 70(60) | 50 | 6.7(99) |
| 10 | 7.2 | 30% aqueous ammonia (1.54, 50) | Pd-carbon (0.5) | 62.8 | 45(120) | 50 | 5.7(87) |
| 11 | 7.2 | 30% aqueous ammonia (2.83, 100) | Stabilized nickel (0.30) | 62.8 | 190(10) | 50 | 6.2(94) |
| 12 | 7.2 | | Stabilized nickel (0.30) | (pH 4.5) 64.8 | 100(90) | 50 | 5.5(83) |
| 13 | 7.2 | | Urushibara cobalt (U-Co-B)(1.5) | 40.8 | 137(120) | 40 | 5.8(88) |
| 14 | 7.2 | | Palladium oxide (0.10) | 40.8 | 100(60) | 50 | 5.5(83) |
| 15 | 7.2 | 30% aqueous ammonia (2.9, 96) | Reduced nickel (1.4) | 62.8 | 90-100(90) | 50 | 6.5(98) |
| 16 | 7.2 | 28% aqueous ammonia (3.1, 100) | Raney cobalt (3.0) | 62.8 | 100(120) | 40 | 6.3(96) |
| 17 | 7.2 | 28% aqueous ammonia (3.1, 100) | Nickel formate catalyst (1.4) | 62.8 | 110(120) | 50 | 6.2(94) |
| 18 | 7.2 | 28% aqueous ammonia (3.1, 100) | Adkins' copper chromite catalyst (1.4). | 64.0 | 150(130) | 80 | 5.5(83) |
| 19 | 7.2 | 28% aqueous ammonia (1.55, 50) | Ruthenium dioxide (0.7) | 64.0 | 200(70) | 50 | 5.6(85) |
| 20 | 7.2 | 28% aqueous ammonia (1.55, 50) | Osmium-carbon (2.1) | 64.0 | 220(60) | 40 | 5.3(81) |
| 21 | 7.2 | 28% aqueous ammonia (3.1, 100) | Colloidal rhodium (0.36) | 64.0 | 40(120) | 40 | 6.3(76) |
| 22 | 7.2 | 28% aqueous ammonia (3.1, 100) | Raney copper (1.4) | 64.0 | 190(60) | 44 | 5.3(81) |

EXAMPLE 23

In a 300-ml. autoclave were placed 7.0 g. of aci-2-nitrocyclohexanone ammonium, 44.1 g. of deionized water of pH 5.8, and 0.2 g. (as palladium) of colloidal palladium, and hydrogen was introduced to an initial pressure of 50 kg./cm.$^2$. The system was stirred at 20° C. The pH of the aqueous solution was 5.5. The further hydrogen absorption was not observable after approximately an hour. The reaction was terminated after an additional 30 minutes' stirring. The reaction mixture was treated similarly as in Example 1, producing 5.5 g. of $\epsilon$-aminocaproic acid. The yield was 96%.

When aci-2-nitrocyclohexanone ammonium was used as the starting material, no by-product formation of $\epsilon$-aminocaproamide was detected by a T.L.C. analysis of the reaction product. As is evident from comparing this result with that of Example 1, the use of aci-2-nitrocyclohexanone ammonium is clearly different from the mere addition of 2-nitrocyclohexanone and equimolar amount thereto of ammonia as for the by-product formation.

The aci-2-nitrocyclohexanone ammonium used in this example was prepared as follows:

21.4 grams of 2-nitrocyclohexanone was dissolved in 200 ml. of carbon tetrachloride, and the solution was cooled with ice. While cooling the system with ice, into 100 ml. of carbon tetrachloride saturated with ammonia gas was gradually dropped into the solution under agitation. Immediately precipitation was observed. Ammonia gas was further bubbled into this reaction mixture to make the whole an insoluble precipitate. Thus, 23.0 g. of aci-2-nitrocyclohexanone ammonium was obtained.

The yield was 96.7%.

The result of elementary analysis was as follows:
Calculated value (percent): C, 44.99; H, 7.55; N, 17.49. Empirical value (percent): C, 45.22; H, 7.46; N, 17.23.

EXAMPLE 24

In a 300-ml., normal pressure catalytic hydrogenation reactor were placed 8.0 g. of aci-2-nitrocyclohexanone ammonium, 72.0 g. of deionized water of pH 5.8, and 0.4 g. of platinum black, and shaken at room temperature. An exothermic hydrogenation reaction took place at atmospheric pressure and room temperature, and substantially a theoretical amount of hydrogen was absorbed within an hour. The shaking was continued for additional 8 hours, before completion of the reaction. The reaction mixture was treated similarly as in Example 1, to obtain 6.4 g. of $\epsilon$-aminocaproic acid. The yield was 98%.

The aci-2-nitrocyclohexanone ammonium used in this example was prepared as follows:

21.4 grams of 2-nitrocyclohexanone was dissolved in 100 ml. of acetone, and ammonia gas was blown over the solution surface with stirring. The precipitate which formed was filtered off, to obtain 22.4 g. of aci-2-nitrocyclohexanone ammonium.

The yield was 94.3%.

EXAMPLE 25

In a 300-ml. autoclave were placed with 6.8 g. (0.0475 mol) of a mixture of 2-nitrocyclohexanone and 2-nitrocyclohexen-1-ol (enol form 80%, keto form 20%), 0.4 g. (0.0025 mol) of aci-2-nitrocyclohexanone ammonium, 6.8 g. of a stabilized nickel catalyst, and 64.8 g. of deionized water of pH 5.8, and hydrogen was introduced to an initial pressure of 51 kg./cm.$^2$. The system was heated with stirring, to 73° C. during the initial 45 minutes, and for additional 2 hours at said temperature. Upon completion of the reaction, the catalyst was filtered off from the reaction mixture. The brown filtrate was treated twice with activated carbon, and whereby converted to a light yellow solution. After the water was distilled off from the solution, the residue was vacuum dried to obtain 6.3 g. of a white solid product. The product gave an infrared absorption spectrum identical with that a $\epsilon$-aminocaproic acid. The yield was 96%.

The aci-2-nitrocyclohexanone ammonium employed in this example was prepared as follows:

20.3 grams of 2-nitrocyclohexanone was dissolved in 100 ml. of ethyl acetate. Into this solution, ammonia gas was bubbled under cooling with ice. The precipitate was filtered off, and washed twice with each 50 ml. of ether. Thus 21.8 g. of aci-2-nitrocyclohexanone ammonium was obtained, which corresponded to a yield of 96.6%.

EXAMPLES 26-39

The following reactions were conducted in the same manner as in Example 23, under the various reaction conditions as indicated for each run in Table 2 below. The results are also given in the same table.

TABLE 2

| Example Number | 2-nitro-cyclohexanone (g.) | Aci-2-nitro-cyclohexanone ammonium (g.) | Aqueous ammonia (g.) | Catalyst (g.) | Water (g.) | Reaction temp. and time (° C., min.) | Initial H$_2$ pressure (kg./cm.$^2$) | ε-Aminocaproic acid yield (g., mol percent) |
|---|---|---|---|---|---|---|---|---|
| 26 | 0 | 8.0 | | Developed Raney nickel (T-4) (0.4) | 72.0 | 90 (60) | 50 | 6.5 (99) |
| 27 | 0 | 8.0 | | Urushibara cobalt (U-Co-B) (3.5) | 32.0 | 130 (60) | 50 | 6.3 (96) |
| 28 | 0 | 8.0 | | Platinum oxide (1.6) | 72.0 | 10-20 (60) | *5 | 6.4 (98) |
| 29 | 0 | 8.0 | | Palladium balck (0.4) | 72.0 | 70 (30) | *10 | 6.4 (98) |
| 30 | 3.6 | 4.0 | 28% aqueous ammonia (1.54) | Colloidal platinum (0.4) | 72.0 | 70 (30) | *10 | 6.2 (94) |
| 31 | 3.6 | 4.0 | | Palladium-carbon (0.3) | 40.8 | 70 (60) | 50 | 6.4 (98) |
| 32 | 7.08 | 0.081 | | Urushibara cobalt (U-Co-B) (3.5) | 28.8 | 110 (120) | 40 | 6.2 (95) |
| 33 | 0 | 8.0 | | Rhodium-carbon (2.4) | 72.0 | 15 (420) | (**) | 6.4 (98) |
| 34 | 0.36 | 7.60 | | Colloidal iridium (0.8) | 64.8 | 20 (120) | 50 | 6.2 (95) |
| 35 | 3.6 | 4.0 | | Palladium-carbon (0.5) | 64.8 | 45 (120) | 50 | 5.7 (87) |
| 36 | 0.36 | 7.60 | | Ruthenium-carbon (0.5) | 64.8 | 190 (10) | 35 | 6.2 (94) |
| 37 | 0 | 8.0 | | Iridium-carbon (1.6) | 72.0 | 120 (60) | 40 | 6.2 (94) |
| 38 | 0 | 8.0 | | Nickel boride (1.6) | 72.0 | 100 (60) | 43 | 6.3 (96) |
| 39 | 0 | 8.0 | | Palladium hydroxide (0.8) | 72.0 | 100 (120) | 45 | 6.4 (98) |

*Fresh hydrogen was additionally supplied during the reaction.
**Atmospheric pressure.

EXAMPLE 40

A 300-ml. autoclave was charged with 21.7 g. of 2-nitrocyclohexanone, 3.71 g. of liquid ammonia (NH$_3$ 300 mol percent/2-nitrocyclohexanone), 135.0 g. of water, and 2.2 g. of a stabilized nickel catalyst, and hydrogen was introduced to an initial pressure of 50 kg./cm.$^2$. The system was then heated with stirring. The reaction was completed after an hour's agitation at 62–92° C.

The catalyst was filtered off from the reaction product, and water also was distilled off under a reduced pressure. The crystalline product was recrystallized from benzene, to obtain 18.9 g. of crystalline ε-aminocaproamide having a melting point of 53° C. and a high hygroscopicity. The yield was 96%.

The melting point corresponded with that of ε-aminocaproamide obtained by conventional methods which is 53° C. The product's infrared absorption spectrum also showed strong characteristic absorptions at 3350 cm.$^{-1}$ (γ NH$_2$), 3170 cm.$^{-1}$ (γ NH$_2$), 1630 cm.$^{-1}$ (γ CONH$_2$) and 900 cm.$^{-1}$ (γ NH$_2$), which are not unlike those of the infrared absorption spectrum of standard ε-aminocaproamide.

EXAMPLE 41

A 300-ml. autoclave was charged with 8.0 g. of aci-2-nitrocyclohexanone ammonium, 6.2 g. of 28% aqueous ammonia (NH$_3$ 200 mol percent/aci-2-nitrocyclohexanone ammonium), 64.0 g. of water, and 0.7 g. of a stabilized nickel catalyst. Under an initial hydrogen pressure of 35 kg./cm.$^2$, the system was reacted at 90° C. for 40 minutes. The reaction mixture was treated similarly as in Example 40, and 5.9 g. of ε-aminocaproamide was obtained. The yield as 91%.

EXAMPLE 42

A 300-ml. autoclave was charged with 21.7 g. of 2-nitrocyclohexanone, 12.7 g. of 28% aqueous ammonia (NH$_3$ 140 mol percent/2-nitrocyclohexanone), 135.0 g. of water, and 2.2 g. of a stabilized nickel catalyst. Under an initial hydrogen pressure of 92 kg./cm.$^2$, the system was heated with stirring, at a reaction temperature of 97° C. for an hour. The catalyst was removed from the reaction mixture and the water was distilled off. The resulting solid product was extracted with 100 ml. of chloroform. After repeating the extraction three times, 10.7 g. of ε-aminocaproamide (yield, 54%) was obtained from the chloroform-soluble fraction, and 7.5 g. of ε-aminocaproic acid (yield, 38%) was recovered from the chloroform-insoluble fraction.

EXAMPLE 43

In a 300-ml. autoclave were placed 30.0 g. of 2-nitrocyclohexanone, 7.1 g. of liquid ammonia (NH$_3$ 200 mol percent/2-nitrocyclohexanone), 120.0 g. of water, and 3.0 g. of a stabilized nickel catalyst. The system was heated under agitation at an initial hydrogen pressure of 50 kg./cm.$^2$. The reaction was completed after 30 minutes' stirring at 62–115° C.

The catalyst was removed and the water was distilled off. The resulting cake was extracted with chloroform. Thus 20.7 g. of ε-aminocaproamide (yield, 76%) was recovered from the chloroform-soluble portion. The chloroform-insoluble fraction consisted of ε-aminocaproic acid, which weighed 6.0 g. The yield was 22%.

EXAMPLE 44

In a 300-ml. autoclave were placed 7.2 g. of 2-nitrocyclohexanone, 3.1 g. of 28% aqueous ammonia (NH$_3$ 100 mol percent/2-nitrocyclohexanone), 64.0 g. of water, 10.0 g. of dioxane, and 0.7 g. of a stabilized nickel catalyst. The system was reacted under an initial hydrogen pressure of 40 kg./cm.$^2$, at 100° C., for 60 minutes.

The reaction mixture was treated similarly as in Example 1, to obtain 6.3 g. of ε-aminocaproic acid. The yield was 96%.

EXAMPLE 45

In a 300-ml. autoclave were placed 7.2 g. of 2-nitrocyclohexanone, 18.6 g. of 28% aqueous ammonia (NH$_3$ 600 mol percent/2-nitrocyclohexanone), 32.0 g. of water, 32.0 g. of methanol, and 0.7 g. of a stabilized nickel catalyst. The reaction of the system was completed after an hour's agitation at 90–100° C., under an initial hydrogen pressure of 40 kg./cm.$^2$. The reaction mixture was then treated similarly as Example 40, to provide 6.2 g. of ε-aminocaproamide. The yield was 94%.

EXAMPLE 46

In a 300-ml. autoclave were placed 7.2 g. of 2-nitrocyclohexanone, 46.5 g. of 28% aqueous ammonia (NH$_3$ 1500 mol percent/2-nitrocyclohexanone, pH, 13.0), 17.7 g. of benzene, and 1.4 g. of a palladium-carbon catalyst. The system was reacted for an hour at 95° C.±5° C., at an initial hydrogen pressure of 40 kg./cm.$^2$. The reaction mixture was then treated similarly as in Example 40, to obtain 6.2 g. of ε-aminocaproamide. The yield was 94%.

EXAMPLE 47

In a 300-ml. autoclave were placed 7.2 g. (0.05 mol) of 2-nitrocyclohexanone (100% keto form), 63.0 g. of deionized water of pH 5.8, 3.9 g. (0.05 mol) of ammonium carbonate, and 1.4 g. of a palladium-carbon catalyst. The system was stirred for 90 minutes at 20° C., under an initial hydrogen pressure of 20 kg./cm.$^2$.

The reaction mixture was then treated similarly as in Example 1, to obtain 6.4 g. of ε-aminocaproic acid. The yield was 98%. The ammonium carbonate employed in the invention was volatilized or decomposed during the distillation of water from the reaction mixture and also during the subsequent vacuum drying of the residue under heating.

It was confirmed by T.L.C. analysis that, when ammonium carbonate was added, no ε-aminocaproamide was produced as a by-product, as distinguished from the addition of ammonia or aqueous ammonia.

EXAMPLE 48

The reaction of Example 47 was repeated except that the amount of ammonium carbonate was increased to 15.6 g. (0.20 mol). 6.5 g. of crude ε-aminocaproic acid was obtained with a crude yield of 98%. The crude ε-aminocaproamide acid prepared by this example contained substantially no ε-aminocaproamide, which was confirmed by means of thin-layer chromatography.

EXAMPLE 49

The reaction of Example 47 was repeated except that the ammonium carbonate was replaced by 3.9 g. (0.05 mol) of ammonium acetate. After filtering off the catalyst from the reaction mixture, water was distilled off at a reduced pressure, using a rotary evaporator on a water bath at 95° C. A part of the ammonium acetate was sublimated or distilled off during this operation. 9.1 g. of this solid product was subjected to thin-layer chromatography according to the method of S. Jean Purdy and E. V. Truter [Chemistry and Industry, March 17 (1962)] to determine ε-aminocaproic acid content. The quantity of ε-aminocaproic acid was 5.7 g., and the yield was 87%. It was also confirmed by T.L.C. analysis that, when ammonium acetate was used, no ε-aminocaproamide was by-produced.

EXAMPLE 50

The reaction of Example 47 was repeated except that the ammonium carbonate was replaced by 15.6 g. (0.20 mol) of ammonium acetate. The reaction product was analyzed in the manner similar to Example 49. The quantity of ε-aminocaproic acid was 6.2 g. and the yield was 94%.

EXAMPLE 51

The reaction of Example 47 was repeated except that the ammonium carbonate was replaced by 3.3 g. (0.025 mol) of ammonium biphosphate. The reaction mixture was treated similarly as in Example 49. 5.4 g. of ε-aminocaproic acid was obtained, which corresponded to a yield of 82%.

In order to substantiate the critical nature of the reaction conditions specified in the present invention, the following controls are provided.

CONTROL 1

The reaction of Example 2 was repeated except that the use of 1.54 g. of 28% aqueous ammonia was omitted. The product obtained was a brown-colored, resin-like mixture which gave an infrared absorption spectrum entirely different from that of pure ε-aminocaproic acid.

CONTROL 2

The reaction of Example 6 was repeated except that the use of 1.54 g. of 28% aqueous ammonia was omitted. Only a resinous mixture was obtained.

CONTROL 3

The reaction of Example 7 was repeated except that the use of 0.9 g. of 10% aqueous ammonia was omitted. Only a resinous mixture was obtained.

CONTROL 4

The reaction of Example 8 was repeated except that the use of 2.83 g. of 30% aqueous ammonia was omitted. Only a resinous mixture was obtained.

CONTROL 5

The reaction of Example 25 was repeated, except that additional 0.4 g. of 2-nitrocyclohexanone was used instead of 0.4 g. of aci-2-nitrocyclohexanone ammonium. Only a resinous mixture was obtained.

CONTROL 6

The reaction of Example 31 was repeated, except that 0.4 g. of aci-2-nitrocyclohexanone ammonium was replaced by 3.6 g. of 2-nitrocyclohexanone. Only a resinous mixture was obtained.

CONTROL 7

The reaction of Example 32 was repeated except that the use of 0.081 g. of aci-2-nitrocyclohexanone ammonium was omitted. Only a resinous mixture was obtained.

CONTROL 8

The reaction of Example 35 was repeated except that 4.0 g. of aci-2-nitrocyclohexanone ammonium was replaced by 3.6 g. of 2-nitrocyclohexanone. Only a resinous mixture was obtained.

CONTROL 9

The reaction of Example 47 was repeated except that the addition of 3.9 g. of ammonium carbonate was omitted. Only a resinous mixture was obtained.

What is claimed is:

1. A process for the preparation of ε-aminocaproic acid, ε-aminocaproamide, or mixtures thereof which comprises contacting 2-nitrocyclohexanone, 2-nitrocyclohexen-1-ol, aci-2-nitrocyclohexanone ammonium or mixtures thereof with hydrogen in an aqueous medium of pH of 4.5–13, at temperatures ranging from 5–220° C., in the presence of an active hydrogenation catalyst selected from the group consisting of metals of Group VIII of the periodic table, compounds thereof which can form the metals in the reaction system, copper and copper chromite; with the proviso that when the temperature employed is not lower than 5° C. but below 75° C., the reaction is conducted in the presence of a source of ammonium ion in the aqueous medium in such an amount as will provide an ammonium ion ratio (x) of at least the value (k) calculated from the following equation:

$$k = \frac{75 - t_1}{70}$$

wherein $t_1$ is the reaction temperature (° C.), said ammonium ion ratio $(x)$ being the quotient obtained by dividing the number of moles of the total $NH_4^+$ ion in the aqueous medium with the total number of moles of 2-nitrocyclohexanone, 2-nitrocyclohexen-1-ol, aci-2-nitrocyclohexanone anion or mixtures thereof in the aqueous medium wherein:

(a) ε-aminocaproic acid is the principal reaction product when the ammonium ion ratio $(x)$ is less than or equal to 1;

(b) a mixture of ε-aminocaproic acid and ε-aminocaproamide is the product when the ammonium ion ratio is less tan 3 but greater than 1; and (c) ε-aminocaproamide is the principal reaction product when the ammonium ion ratio is equal to or greater than 3.

2. The process in accordance with claim 1 in which 2-nitrocyclohexanone, aci-2-nitrocyclohexanone ammonium, 2-nitrocyclohexen-1-ol or mixtures thereof is contacted with hydrogen in an aqueous medium of pH 4.5–13 which contains ammonium ion, at temperatures ranging 75–220° C., in the presence of an active hydrogenation catalyst.

3. The process in accordance with claim 1 in which the amount of the ammonium ion ($NH_4^+$) is such as will provide the ammonium ion ratio ($x$) of at least the value ($k'$) calculated from the following equation;

$$k' = 0.1 + a\left(\frac{75 - t_1}{70}\right)$$

wherein $t_1$ is a reaction temperature selected from the range of 20–200° C., and $a$ is a constant which is 0 when $t_1$ is 75–200° C., and 1 when $t_1$ is greater than or equal to 20° C. but less than 75° C.

4. The process in accordance with claim 1, in which the pH of aqueous medium ranges 5.5–12.

5. The process in accordance with claim 1, in which the active hydrogenation catalyst is a member of the group consisting of nickel, platinum, palladium, cobalt, or compounds of such metals which can form nickel, platinum, palladium and cobalt in the reaction system.

6. The process in accordance with claim 1 in which 2-nitrocyclohexanone, 2-nitrocyclohexan-1-ol, aci-2-nitrocyclohexanone ammonium or mixtures thereof are heated in an aqueous medium of pH 4.5–13, at a temperature within the range of 150°–220° C., the heating time (H) at the selected temperature being controlled to meet the following condition $$H \leq 280 - t_2$$

wherein $t_2$ is a temperature within the range of 150–220° C.

7. The process in accordance with claim 1 wherein the source of ammonium ion is ammonia or aqueous ammonia.

8. The process in accordance with claim 1 wherein aci-2-nitrocyclohexanone ammonium is contacted with hydrogen in an aqueous medium at a pH of 4.5–13 and a temperature within the range of 5–220° C.

9. The process in accordance with claim 1 wherein 2-nitrocyclohexanone, 2-nitrocyclohexen-1-ol and aci-2-nitrocyclohexanone ammonium are contacted with hydrogen at a pH of 4.5–13 and a temperature within the range of 5–220° C.

10. The process in accordance with claim 1 in which 2-nitrocyclohexanone, 2-nitrocyclohexen-1-ol, aci-2-nitrocyclohexanone ammonium or mixtures thereof are heated in an aqueous medium of pH 4.5–13, at a temperature within the range of 150°–220° C., the heating time (H) at the selected temperature being controlled to meet the following condition $$H \leq 275 - t_2$$

wherein $t_2$ is a temperature within range of 150–220° C.

11. The process in accordance with claim 1 wherein 2-nitrocyclohexanone, 2-nitrocyclohexen-1-ol or mixtures thereof are contacted with hydrogen in an aqueous medium at a pH of 4.5–13 and a temperature within the range of 5–220° C.

12. The process of claim 6 wherein the source of ammonium ion is ammonia or aqueous ammonia.

13. The process of claim 1 wherein the source of ammonium ion is aci-2-nitrocyclohexanone ammonium.

References Cited

Chem. Abstracts, vol. 67, 1967, col. 21308g, Matlack et al.

LORRAINE A. WEINBERGER, Primary Examiner

J. L. DAVISON, Assistant Examiner

U.S. Cl. X.R.

260—561 A, 586 R